(12) United States Patent
Mullins

(10) Patent No.: US 9,639,984 B2
(45) Date of Patent: May 2, 2017

(54) DATA MANIPULATION BASED ON REAL WORLD OBJECT MANIPULATION

(71) Applicant: DAQRI, LLC, Los Angeles, CA (US)

(72) Inventor: Brian Mullins, Garden Grove, CA (US)

(73) Assignee: DAQRI, LLC, Los Angeles, CA (US)

( * ) Notice: Subject to any disclaimer, the term of this patent is extended or adjusted under 35 U.S.C. 154(b) by 154 days.

(21) Appl. No.: 13/909,046

(22) Filed: Jun. 3, 2013

(65) Prior Publication Data
US 2014/0354686 A1 Dec. 4, 2014

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2215/16* (2013.01); *G06T 2219/2016* (2013.01)

(58) Field of Classification Search
CPC ... G06T 19/006; G06T 7/0079–7/0097; G06K 9/00221–9/00315
See application file for complete search history.

(56) References Cited

U.S. PATENT DOCUMENTS

| 5,966,129 A | 10/1999 | Matsukuma et al. | |
|---|---|---|---|
| 6,771,294 B1 * | 8/2004 | Pulli et al. | 715/863 |
| 8,887,066 B1 * | 11/2014 | Deng | 715/753 |
| 2010/0013860 A1 | 1/2010 | Mandella et al. | |
| 2010/0226535 A1 * | 9/2010 | Kimchi et al. | 382/103 |
| 2011/0037712 A1 | 2/2011 | Kim et al. | |
| 2012/0081529 A1 | 4/2012 | Seo | |
| 2012/0243743 A1 | 9/2012 | Pastor et al. | |
| 2012/0256956 A1 * | 10/2012 | Kasahara | G06F 3/04815 345/633 |
| 2014/0028712 A1 * | 1/2014 | Keating | G06T 19/006 345/633 |

FOREIGN PATENT DOCUMENTS

| EP | 0753835 A2 | 1/1997 |
|---|---|---|
| JP | 2012069111 A | 4/2012 |
| KR | 1020110028185 A | 3/2011 |
| KR | 1020110054376 A | 5/2011 |

(Continued)

OTHER PUBLICATIONS

"International Application Serial No. PCT/US2014/040555, International Search Report mailed Oct. 20, 2014", 3 pgs.

(Continued)

*Primary Examiner* — Daniel Hajnik
(74) *Attorney, Agent, or Firm* — Schwegman Lundberg & Woessner, P.A.

(57) ABSTRACT

A system and method for data manipulation based on real world object manipulation is described. A device captures an image of a physical object. The image is communicated via a network to a remote server. The remote server includes virtual object data associated with the image and a communication notification for a user of the computing device. The device receives the virtual object data and displays the virtual image in a virtual landscape using the virtual object data. In response to relative movement between the computing device and the physical object caused by the user, the virtual image is modified.

20 Claims, 14 Drawing Sheets

(56) References Cited

FOREIGN PATENT DOCUMENTS

| KR | 1020120133648 A | 12/2012 |
|----|-----------------|---------|
| WO | WO-2011106520 A1 | 9/2011 |
| WO | WO-2013061504 A1 | 5/2013 |
| WO | WO-2014197394 A1 | 12/2014 |

OTHER PUBLICATIONS

"International Application Serial No. PCT/US2014/040555, Written Opinion mailed Oct. 20, 2014", 6 pgs.
"International Application Serial No. PCT/US2014/040555, International Preliminary Report Patentability mailed Sep. 17, 2015",4 pgs.
"European Application Serial No. 14807284.6, Extended European Search Report mailed Dec. 16, 2016", 7 pgs.

* cited by examiner

DATA MANIPULATION BASED ON REAL WORLD OBJECT MANIPULATION

TECHNICAL FIELD

The subject matter disclosed herein generally relates to the processing of data. Specifically, the present disclosure addresses systems and methods for manipulating data based on real physical object manipulation.

BACKGROUND

A device can be used to generate and display data in addition an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
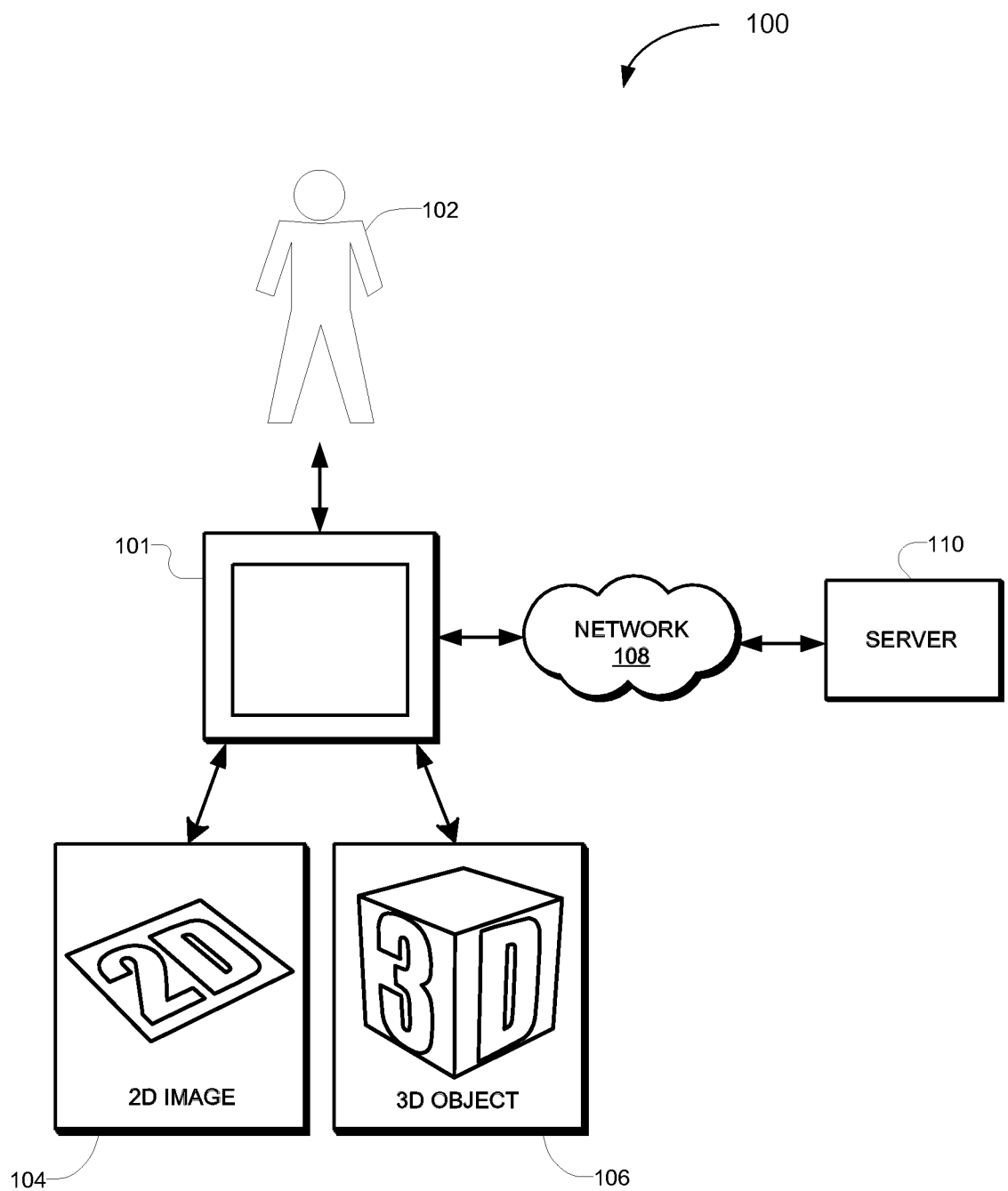
FIG. 1 is a block diagram illustrating an example of a network suitable for operating an augmented reality server, according to some example embodiments.

Example methods and systems are directed to data manipulation based on real world object manipulation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a three-dimensional virtual object overlaid on a picture of a physical object captured by a camera of a device. The physical object may include a visual reference that the augmented reality application can identify. A visualization of the additional information, such as the three-dimensional virtual object overlaid or engaged with an image of the physical object is generated in a display of the device. The three-dimensional virtual object may selected based on the recognized visual reference or captured image of the physical object. A rendering of the visualization of the three-dimensional virtual object may be based on a position of the display relative to the visual reference.

A system and method for data manipulation based on real world object manipulation is described. A device captures an image of a physical object. The image is communicated via a network to a remote server. The remote server includes virtual object data associated with the image and a communication notification for a user of the computing device. The device receives the virtual object data and displays the virtual image in a virtual landscape using the virtual object data. In response to relative movement between the computing device and the physical object caused by the user, the virtual image is modified.

In another embodiment, a virtual object associated with a communication notification for a user of a device is generating in a display of the device. The virtual object is associated with the communication notification for the user of the device. The virtual object is engaged with an image of a physical object captured by the device. The physical object is associated with the communication notification. A visualization of the virtual object is rendered based a position of the device relative to the physical object. The physical object is identified. Virtual functions associated with physical manipulations of the physical object are identified. A virtual function corresponding to a manipulation of the physical object is generated.

In an example embodiment, a device includes an augmented reality notification module and a physical world manipulation module. The augmented reality notification module may generate, in a display of the device, a virtual object associated with a communication notification for a user of the device. The virtual object may be engaged with an image of a physical object captured by the device. The physical object may be associated with the communication notification. The augmented reality notification module renders a visualization of the virtual object based a position of the device relative to the physical object. The physical world manipulation module may identify the physical object, access virtual functions associated with physical manipulations of the physical object, and generate a virtual function corresponding to a manipulation of the physical object.

In an example embodiment, the device includes a notification module to access the communication notification from a notification server associated with the user of the device. The notification server may generate an email notification, a calendar reminder notification, and a social network notification.

In an example embodiment, the augmented reality notification module comprises a reference identifier module, a notification visualization module, and a virtual object generator. The reference identifier module may access reference identifiers associated with the communication notification. The notification visualization module may access an augmented reality visualization associated with the reference identifiers. The virtual object generator may generate the virtual object engaged with a reference identifier in the image of the physical object using the augmented reality visualization associated with the reference identifier in the image of the physical object.

In an example embodiment, the notification visualization module may change a feature of the virtual object, and replace the virtual object with another virtual object based on the augmented reality visualization associated with the reference identifier in the image of the physical object.

In an example embodiment, the physical world manipulation module comprises a physical object identifier, a physical object manipulation detector, and a virtual actuator. The physical object identifier may identify the physical object and virtual functionalities associated with physical manipulations of the physical object. The physical object manipulation detector may identify a physical manipulation of the physical object. The virtual actuator may generate the virtual function corresponding to the identified physical manipulation of the physical object. The virtual actuator may generate a virtual user interface corresponding to the identified physical manipulation of the physical object. The virtual actuator may activate a function on the device in response to the identified physical manipulation of the physical object.

The virtual actuator may generate a command for the virtual function to control another device in response to the identified physical manipulation of the physical object. The other device may have no communication with the physical object. The physical manipulation of the physical object may include moving or rotating the physical object.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an augmented reality application of a device, according to some example embodiments. The network environment 100 includes a device 101 and a server 110, communicatively coupled to each other via a network 108. The device 101 and the server 110 may each be implemented in a computer system, in whole or in part, as described below with respect to FIG. 12.

The server 110 may be part of a network-based system. For example, the network-based system may be or include a cloud-based server system that provides additional information such, as three-dimensional models, to the device 101.

FIG. 1 illustrates a user 102 using the device 101. The user 102 may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the device 101 and may be a user 102 of the device 101. For example, the device 101 may be a desktop computer, a vehicle computer, a tablet computer, a navigational device, a portable media device, a smart phone, or a wearable computing device (e.g., watch or glasses).

The user 102 may be a user of an application in the device 101. The application may include an augmented reality application configured to provide the user 102 with an experience triggered by a physical object, such as, a two-dimensional physical object 104 (e.g., a picture) or a three-dimensional physical object 106 (e.g., a statue). For example, the user 102 may point a camera of the device 101 to capture an image of the two-dimensional physical object 104. The image is recognized locally in the device 101 using a local context recognition dataset module of the augmented reality application of the device 101. The augmented reality application then generates additional information corresponding to the image (e.g., a three-dimensional model) and presents this additional information in a display of the device 101 in response to identifying the recognized image. If the captured image is not recognized locally at the device 101, the device 101 downloads additional information (e.g., the three-dimensional model) corresponding to the captured image, from a database of the server 110 over the network 108.

The device 101 may capture and submit analytics data to the server 110 for further analysis on usage and how the user 102 is interacting with the physical object. For example, the analytics data may track at what the locations (e.g., points or features) on the physical or virtual object the user 102 has looked, how long the user 102 has looked at each location on the physical or virtual object, how the user 102 held the device 101 when looking at the physical or virtual object, which features of the virtual object the user 102 interacted with (e.g., such as whether a user 102 tapped on a link in the virtual object), and any suitable combination thereof. The device 101 receives a visualization content dataset related to the analytics data. The device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
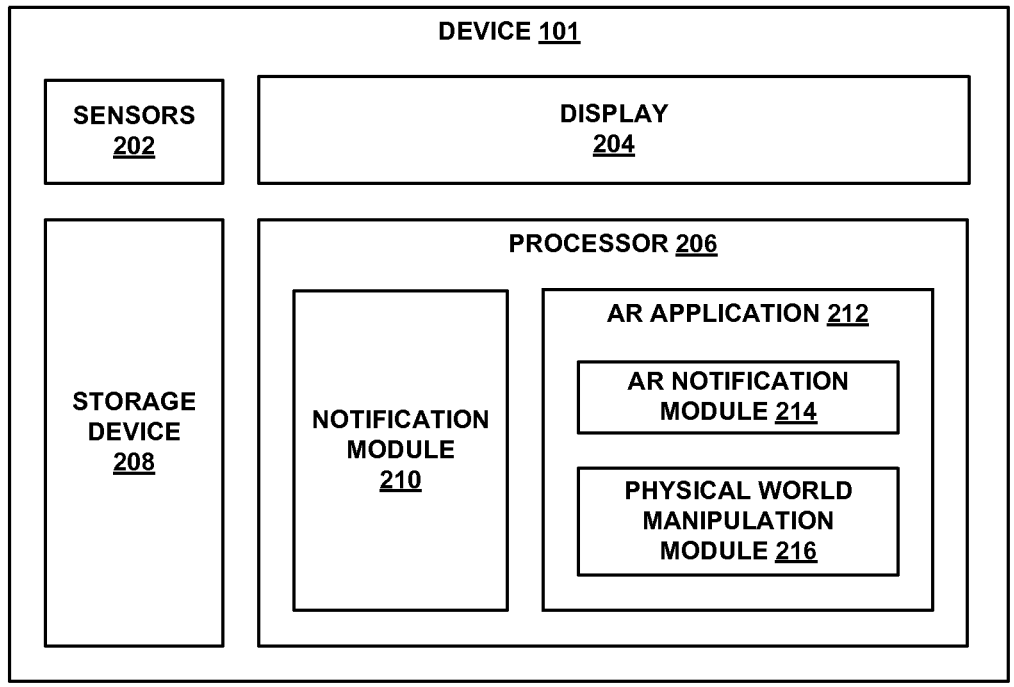
FIG. 2 is a block diagram illustrating modules (e.g., components) of a device, according to some example embodiments.

FIG. 2 is a block diagram illustrating modules (e.g., components) of the device 101, according to some example embodiments. The device 101 may include sensors 202, a display 204, a processor 206, and a storage device 216. For example, the device 101 may be a desktop computer, a vehicle computer, a tablet computer, a navigational device, a portable media device, or a smart phone of a user. The user may be a human user (e.g., a human being), a machine user (e.g., a computer configured by a software program to interact with the device 101), or any suitable combination thereof (e.g., a human assisted by a machine or a machine supervised by a human).

The sensors 202 may include, for example, a proximity sensor, an optical sensor (e.g., camera), an orientation sensor (e.g., gyroscope), an audio sensor (e.g., a microphone), or any suitable combination thereof. For example, the sensors 202 may include a rear facing camera and a front facing camera in the device 101. It is noted that the sensors described herein are for illustration purposes and the sensors 202 are thus not limited to the ones described.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user can see through the display 104.

The processor 206 may include a notification module 210, an augmented reality application 212. The notification module 210 may access the communication notification from a notification server associated with the user of the device 101. For example, the notification server may include an email server configured to generate email notification, appointment reminder, and task reminders. The notification server may include a social network server configured to generate notification of social network information updates related to the user of the device 101.

The augmented reality application 212 may generate a visualization of a three-dimensional virtual object overlaid (e.g., superimposed upon, or otherwise displayed in tandem with) on an image of a physical object captured by a camera of the device 101 in the display 204 of the device 101. A visualization of the three-dimensional virtual object may be manipulated by adjusting a position of the physical object (e.g., its physical location, orientation, or both) relative to the camera of the device 101. Similarly, the visualization of the three-dimensional virtual object may be manipulated by adjusting a position camera of the device 101 relative to the physical object.

In one embodiment, the augmented reality application 212 retrieve three-dimensional models of virtual objects associated with a captured image (e.g., a virtual object that corresponds to the captured image. For example, the captured image may include a visual reference (also referred to as a marker) that consists of an identifiable image, symbol, letter, number, machine-readable code. For example, the visual reference may include a bar code, a quick response (QR) code, or an image that has been previously associated with a three-dimensional virtual object (e.g., an image that has been previously determined to correspond to the three-dimensional virtual object).

In one embodiment, the augmented reality application 212 includes an augmented reality notification module 214 and a physical world manipulation module 216. The augmented reality notification module 214 generates, in the display 204 of the device 101, a virtual object (e.g., a yellow reminder sticky note) associated with a communication notification (e.g., a reminder to call a doctor) for the user of the device 101. For example, the virtual object (e.g., yellow reminder sticky note) may be engaged (e.g., float on top of the physical telephone) with an image of a physical object (e.g., a physical telephone) captured by the device 101. In particular, the physical object (e.g., physical telephone) may be associated with the communication notification (e.g., a reminder or a voicemail). The augmented reality notification module 214 then renders a visualization of the virtual object (e.g., a voicemail symbol) based a position of the device 101 relative to the physical object (e.g. a physical telephone). The augmented reality notification module 214 is described in more detail below with respect to FIG. 3.

In one embodiment, the physical world manipulation module 216 may identify the physical object (e.g., a physical telephone), access virtual functions (e.g., increase or lower the volume of a nearby television) associated with physical manipulations (e.g., lifting a physical telephone handset) of the physical object, and generate a virtual function corresponding to a physical manipulation of the physical object. The physical world manipulation module 216 is described in more detail below with respect to FIG. 4.

In another embodiment, the device 101 includes a contextual local image recognition module (not shown) configured to determine whether the captured image matches an image locally stored in a local database of images and corresponding additional information (e.g., three-dimensional model and interactive features) on the device 101. In one embodiment, the contextual local image recognition module retrieves a primary content dataset from the server 110, generates and updates a contextual content dataset based an image captured with the device 101.

The storage device 208 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the device 101 relative to the picture of the shoe. Features of the three-dimensional virtual shoe may include selectable icons on the three-dimensional virtual model of the shoe. An icon may be selected or activated by tapping or moving on the device 101.

In one embodiment, the storage device 208 includes a primary content dataset, a contextual content dataset, a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the augmented reality application 212 of the device 101.

The contextual content dataset includes, for example, a second set of images and corresponding experiences (e.g., three-dimensional virtual object models) retrieved from the server 110. For example, images captured with the device 101 that are not recognized (e.g., by the server 110) in the primary content dataset are submitted to the server 110 for recognition. If the captured image is recognized by the server 110, a corresponding experience may be downloaded at the device 101 and stored in the contextual content dataset. Thus, the contextual content dataset relies on the context in which the device 101 has been used. As such, the contextual content dataset depends on objects or images scanned by the augmented reality application 212 of the device 101.

In one embodiment, the device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
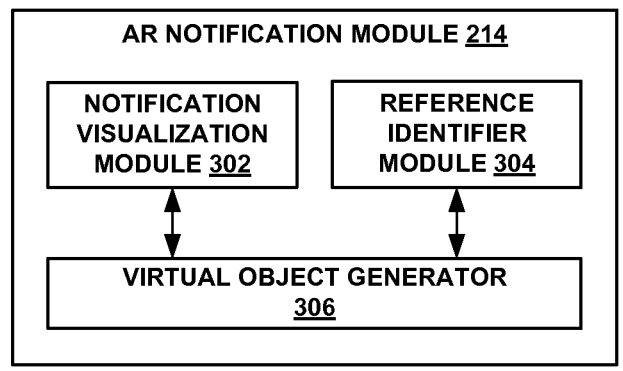
FIG. 3 is a block diagram illustrating modules (e.g., components) of an augmented reality notification module, according to some example embodiments.

FIG. 3 is a block diagram illustrating modules (e.g., components) of the augmented reality notification module 214 of FIG. 2, according to some example embodiments. The augmented reality notification module 214 may include a reference identifier module 304, a notification visualization module 302, and a virtual object generator 306. The reference identifier module 304 may access reference identifiers associated with the communication notification. For example, the reference identifier may be the picture of a black physical letter tray associated with email notifications. The notification visualization module 302 may access an augmented reality visualization associated with the reference identifiers. For example, the augmented reality visualization may include a flashing email icon associated with the black physical letter tray or a virtual stack of letters associated with a white physical letter tray. In another example, the black physical letter tray may be associated with emails from a specific email account while the white physical letter tray may be associated with another email account or a social network service account.

The virtual object generator 306 may generate the virtual object engaged with a reference identifier in the image of the physical object using the augmented reality visualization associated with the reference identifier in the image of the physical object. For example, upon receiving a new email notification, the virtual object generator 306 generates a virtual flashing email icon above the captured image of the physical letter tray in the display 204 of the device 101.

In another embodiment, the notification visualization module 302 may change a feature of the virtual object. For example, an email icon may change to a different color based on the new email notification. For example, a new email marked urgent or important may cause the virtual object generator 306 to generate a flashing red email icon on top of an image of the physical letter tray in the display 204 of the device 101. In another example, an icon representative of a social network service may be displayed based on a new social network activity notification. For example, a social network notification with an update from a friend may cause the virtual object generator 306 to generate the icon representative of the social network service with a picture of the friend on top of an image of the physical letter tray in the display 204 of the device 101.

In another embodiment, the notification visualization module 302 may replace the virtual object with another virtual object (remove the virtual object, add another virtual object) based on the augmented reality visualization associated with the reference identifier in the image of the physical object.

Figure 4:
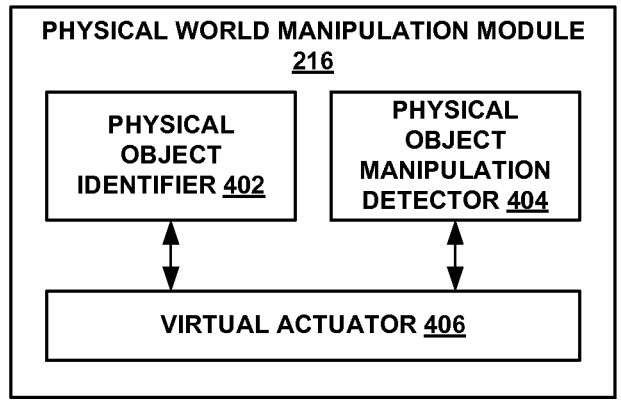
FIG. 4 is a block diagram illustrating modules (e.g., components) of a physical world manipulation module, according to some example embodiments.

FIG. 4 is a block diagram illustrating modules (e.g., components) of the physical world manipulation module 216 of FIG. 2, according to some example embodiments. The physical world manipulation module 216 comprises a physical object identifier 402, a physical object manipulation detector 404, and a virtual actuator 406.

The physical object identifier 402 may identify the physical object and virtual functionalities associated with physical manipulations of the physical object. For example, a physical knob on a wall may have no functionalities with any other device in the real physical world. In other words, the knob can only rotate and is not electrically connected to any other device. Thus, the rotation of the knob does not affect any other devices in the physical world. As such, the physical object identifier 402 may identify the knob and associated virtual functionalities based on physical manipulations of the knob. In other words, rotating the knob clockwise may trigger a function to increase the volume of a nearby television set even though the knob and the nearby television set do not have any physical or electrical relationship. Similarly, rotating the knob counter-clockwise may trigger a function to decrease the volume of the nearby television set. As such, virtual functionalities may be assigned to any physical object in the physical world. In another example, the physical manipulation may include placing a remote control with face up on a table with the associated virtual functionality of turning on a nearby television set and lowering the lights in the same room even though the lights are not electrically connected or in communication with the remote control. Similarly, the physical manipulation may include placing the remote control face down on the table with the associated virtual functionality of turning off the nearby television set and raising the lights in the same room even though the lights are not electrically connected or in communication with the remote control.

The physical object manipulation detector 404 may identify a physical manipulation of the physical object. For example, the physical object manipulation detector 404 may identify whether the remote control is placed face up or face down on a surface. In another example, the physical object manipulation detector 404 may identify the rotation of a dial or a knob or the position of a switch. In another example, the physical object manipulation detector 404 may determine whether a door is closed or open.

The virtual actuator 406 may generate the virtual function corresponding to the identified physical manipulation of the physical object. In one embodiment, the virtual actuator 406 generates a virtual user interface corresponding to the identified physical manipulation of the physical object. For example, a switch moving to an on position may generate a specific virtual user interface to be displayed on top of the switch. In another example, the lid of a box may be opened to generate a virtual user interface displayed inside the box.

The virtual actuator 406 may generate a command for the virtual function to control another device in response to the identified physical manipulation of the physical object. In one embodiment, the other device has no relationship or is not electrically connected to the physical object.

In another example, the virtual actuator 606 may generate a command such as turning a phone to do not disturb mode and sending an email or a text to a predefined recipient associated with the physical object.

Figure 5:
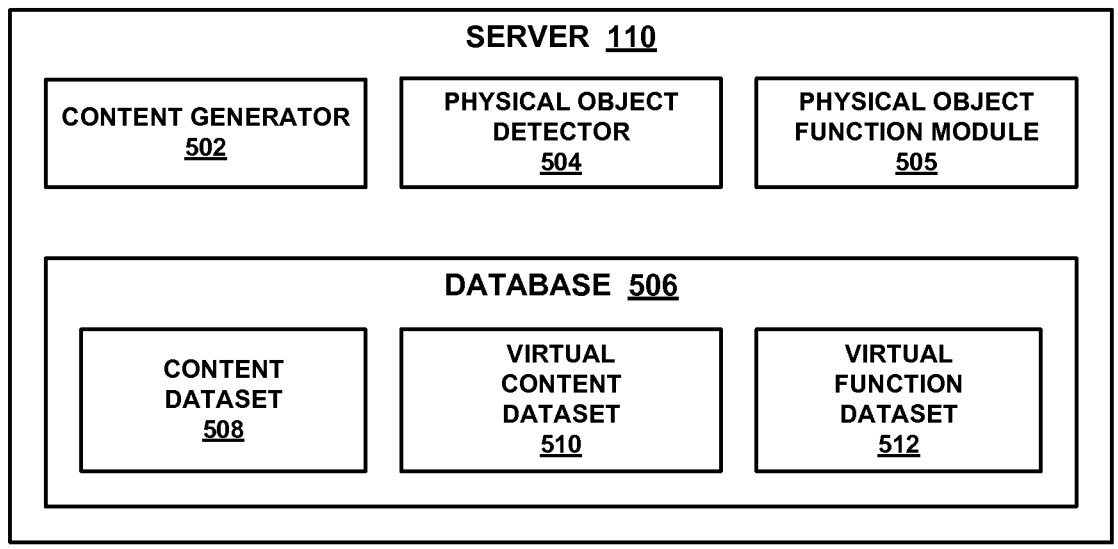
FIG. 5 is a block diagram illustrating modules (e.g., components) of a server, according to some example embodiments.

FIG. 5 is a block diagram illustrating modules (e.g., components) of the server 110, according to some example embodiments. The server 110 includes a content generator 502, a physical object detector 504, a physical object function module 505, and a database 506.

The content generator 502 may generate a model of a virtual object to be rendered in the display 204 of the device 101 based on a position of the device 101 relative to the physical object. The physical object detector 504 identifies a physical movement of the physical object from an image captured by the device 101. The physical object function module 505 determines the virtual functionalities associated with the physical movement.

The database 506 may store a content dataset 508, a virtual content dataset 510, and a virtual function dataset 512. The content dataset 508 may store a primary content dataset and a contextual content dataset. The primary content dataset comprises a first set of images and corresponding virtual object models. The content generator 502 determines that a captured image received from the device 101 is not recognized in the content dataset 508, and generates the contextual content dataset for the device 101. The contextual content dataset may include a second set of images and corresponding virtual object models. The virtual content dataset 510 includes models of virtual objects to be generated upon receiving a notification associated with an image of a corresponding physical object. The virtual function dataset 512 includes virtual functionalities associated with corresponding physical manipulation of physical objects.

Figure 6:
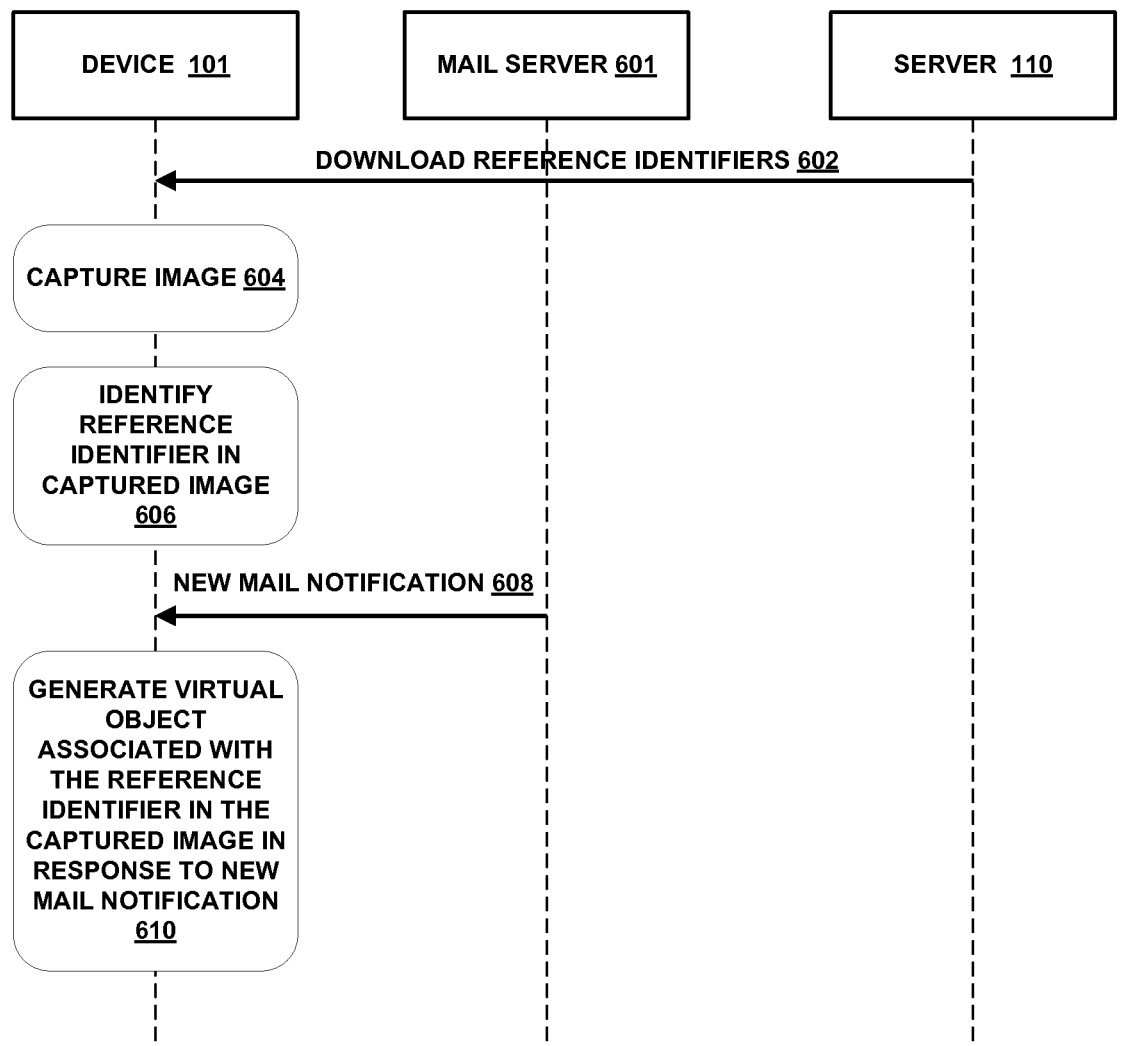
FIG. 6 is a ladder diagram illustrating an operation of the augmented reality notification module of the device of FIG. 1, according to some example embodiments.

FIG. 6 is a ladder diagram illustrating an operation of the augmented reality notification module 214 of the device 101, according to some example embodiments. At operation 602, the device 101 downloads a set of reference identifiers. At operation 604, the device 101 captures an image of a physical object. At operation 606, the device identifies a reference identifier in the captured image of the physical object. At operation 608, a mail server 602 sends a new mail notification to the device 101. At operation 610, the device 101 generates a virtual object associated with the reference identifier in the captured image in response to the new mail notification from mail server 601.

Figure 7:
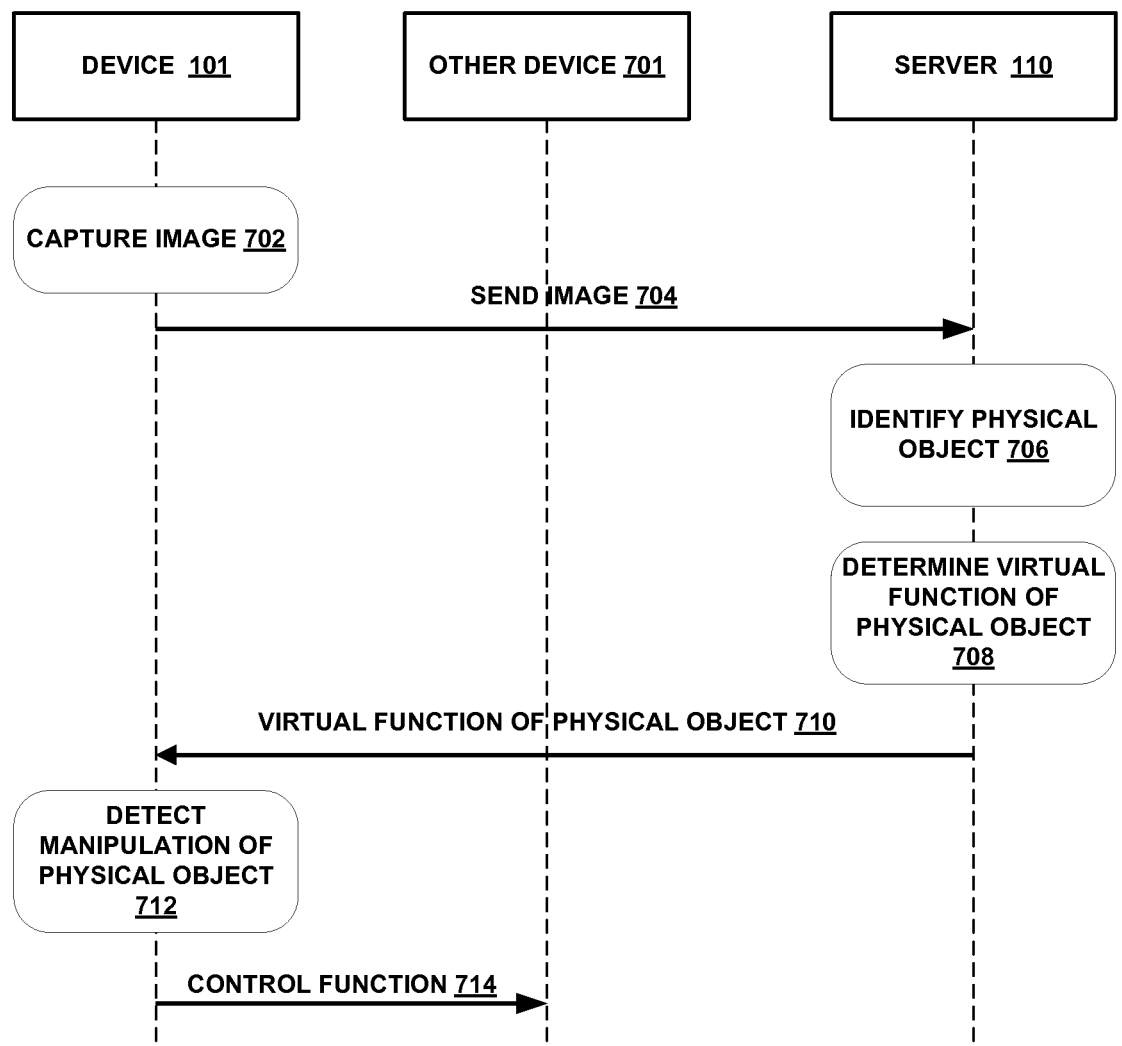
FIG. 7 is a ladder diagram illustrating an operation of the physical world manipulation module, according to some example embodiments.

FIG. 7 is a ladder diagram illustrating an operation of the physical world manipulation module 216 of the device 101, according to some example embodiments. At operation 702, the device 101 is used to capture an image of a physical object. At operation 704, the device 101 sends the image of the physical object to the server 110. At operation 706, the server 110 identifies and recognizes the physical object from the image sent by the device 101. In other words, the server 110 compares an image of the physical object with the identified physical objects with virtual functionalities stored in the database 506 of FIG. 5. At operation 708, the server 110 determines the virtual function of the physical object. At operation 710, the server 110 sends the virtual functionality of the physical object to the device 101. At operation 712, the device 101 detects that manipulation of the physical object and generates the corresponding virtual functionality to another device 701. In one embodiment, the physical object detected by the device 101 is not electrically coupled to the other device 701.

Figure 8A:
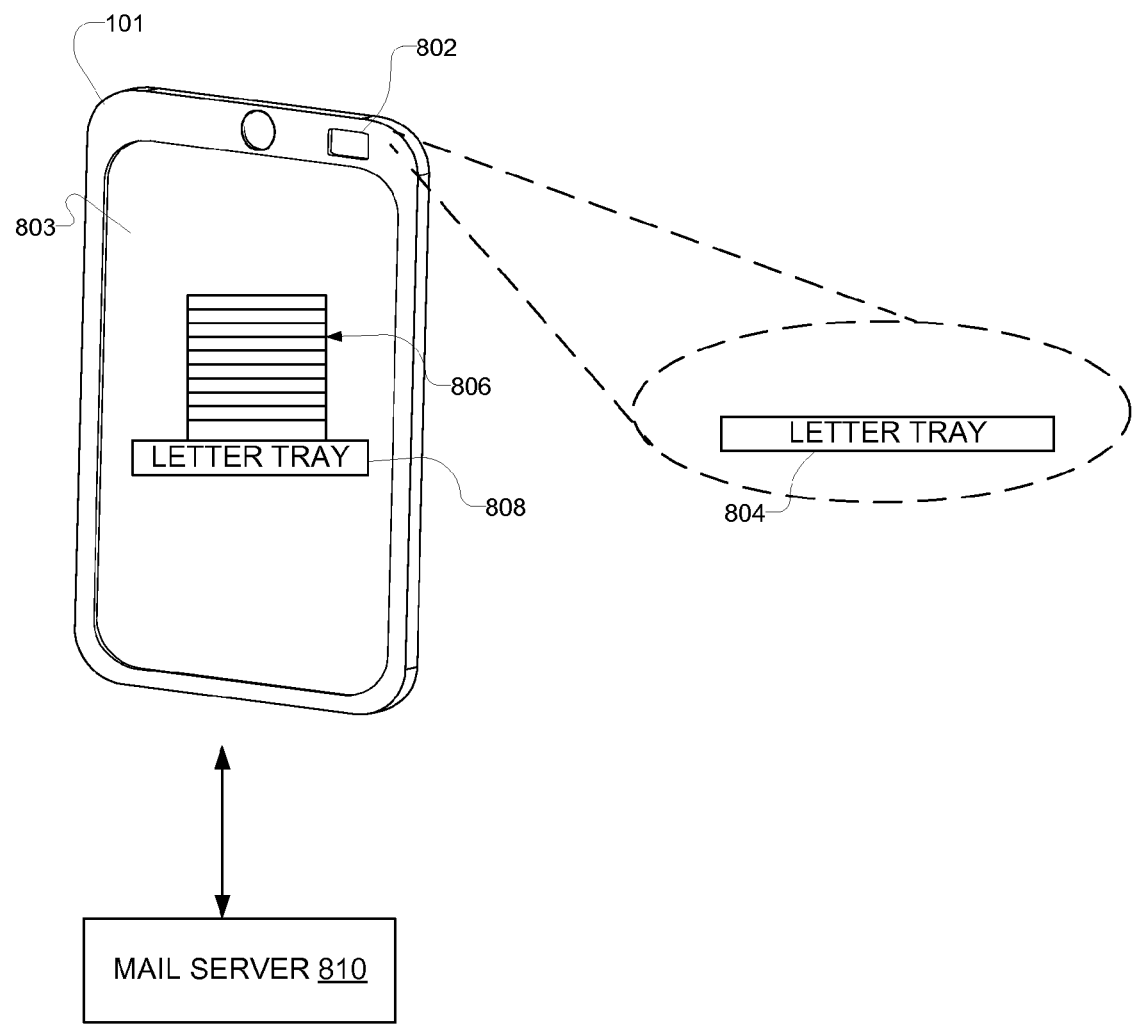
FIG. 8A is a diagram illustrating a first example operation of the augmented reality notification module of the device of FIG. 1.

FIG. 8A is a diagram illustrating a first example operation of the augmented reality notification module 214 of the device 101. The device 101 captures using its rear camera 802, an image of a physical letter tray 804. The device 101 receives a notification of new emails from a mail server 810. In response to the notification of new emails, the device 101 generates a virtual stack of mails 806 on top of the image of the letter tray 808 in the display 803.

Figure 8B:
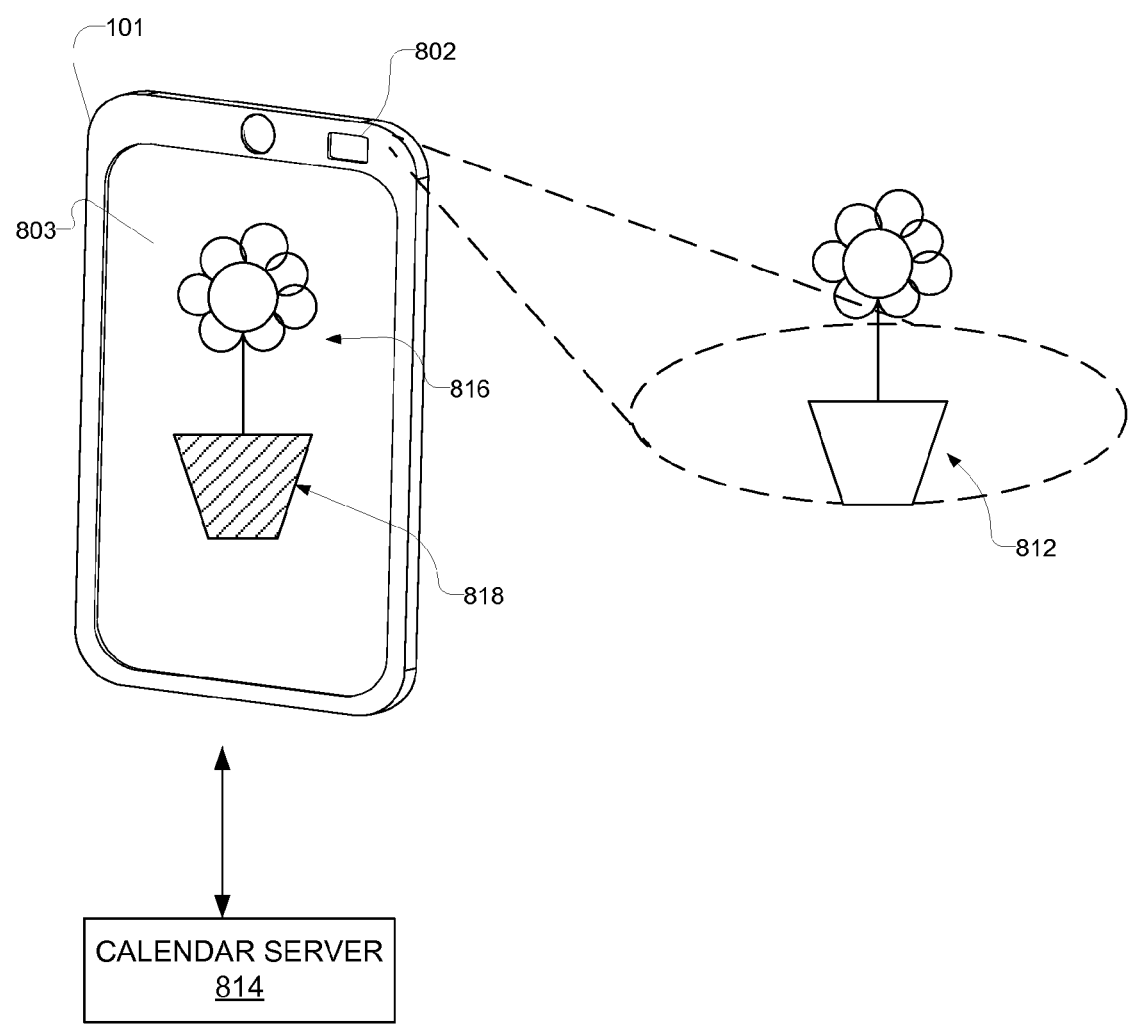
FIG. 8B is a diagram illustrating a second example operation of the augmented reality notification module of the device of FIG. 1.

FIG. 8B is a diagram illustrating a second example operation of the augmented reality notification module 214 of the device 101. The device 101 captures using its rear camera 802, an image of a flower pot 812. The device 101 receives a notification of a reminder to water the flower pot 812 from a calendar server 814. In response to the notification of the reminder, the device 101 generates, in the display 803, a picture of the flower pot 816 and colors the picture of the flower pot 816 in yellow 818.

Figure 8C:
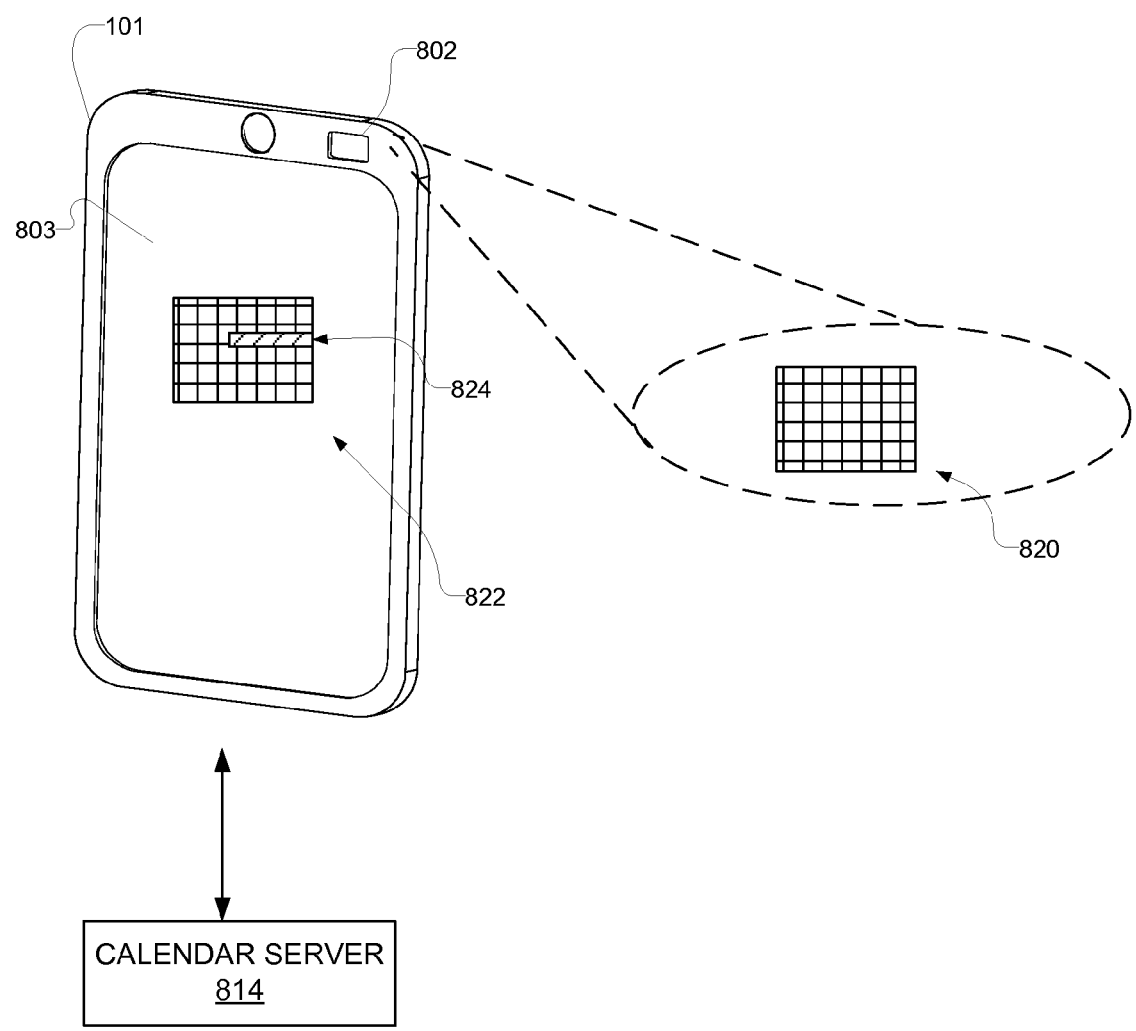
FIG. 8C is a diagram illustrating a third example operation of the augmented reality notification module of the device of FIG. 1.

FIG. 8C is a diagram illustrating a third example operation of the augmented reality notification module 214 of the device 101. The device 101 captures using its rear camera 802, an image of a calendar 820. The device 101 receives a notification of holidays from the calendar server 814. In response to the notification of holidays, the device 101 generates, in the display 803, a picture of the calendar 822 with the dates of the holidays filled in colors 824 in the display 803 of the picture of the calendar 822.

Figure 9A:
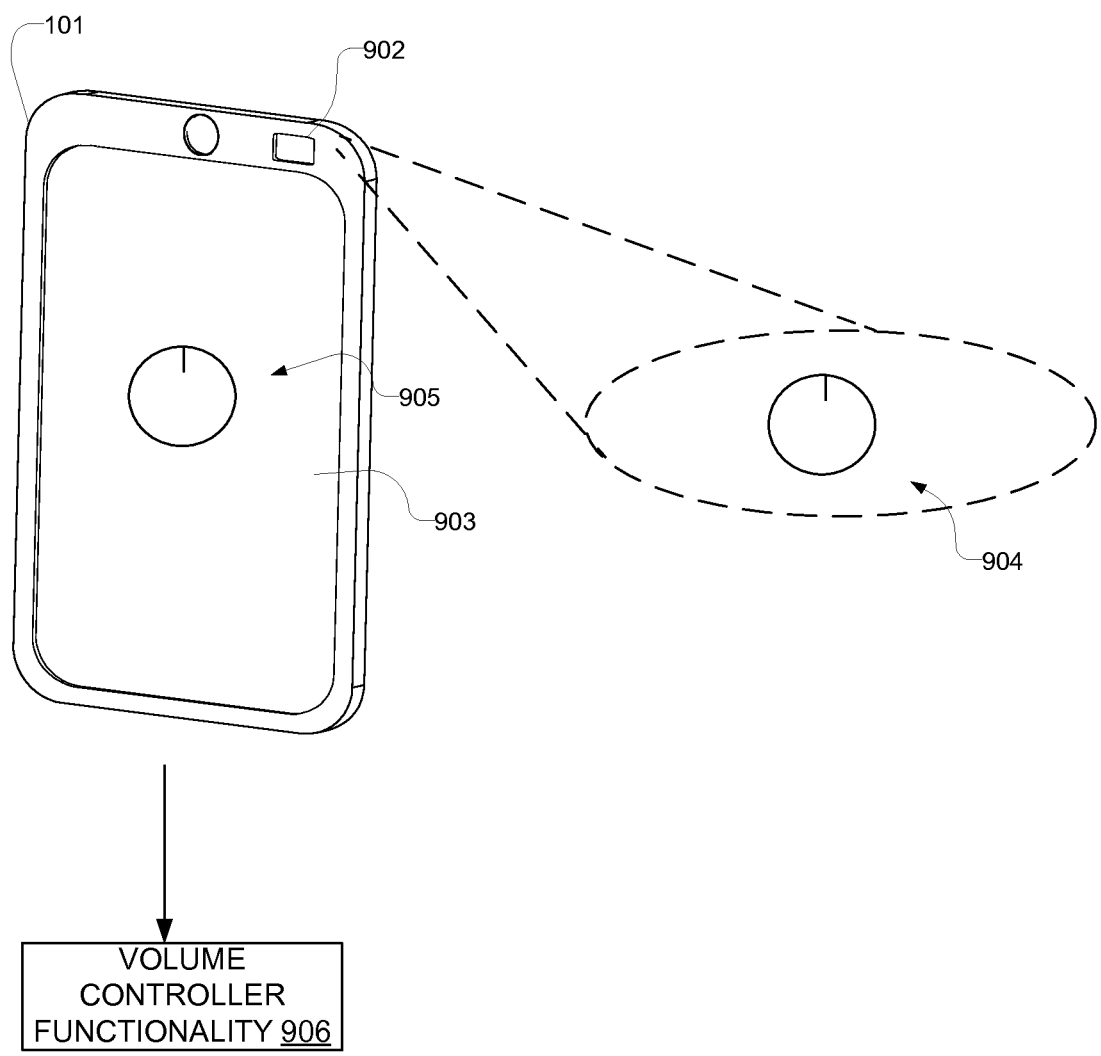
FIG. 9A is a diagram illustrating a first example operation of the physical world manipulation module of the device of FIG. 1.

FIG. 9A is a diagram illustrating a first example operation of the physical world manipulation module 216 of the device 101. The device 101 captures using its rear camera 902, an image 905 of a knob 904 for display in the display 903. The device 101 retrieves virtual functionalities associated with physical manipulations of the knob 904. For example, the virtual functionalities of the knob 904 may include volume control functions 906.

Figure 9B:
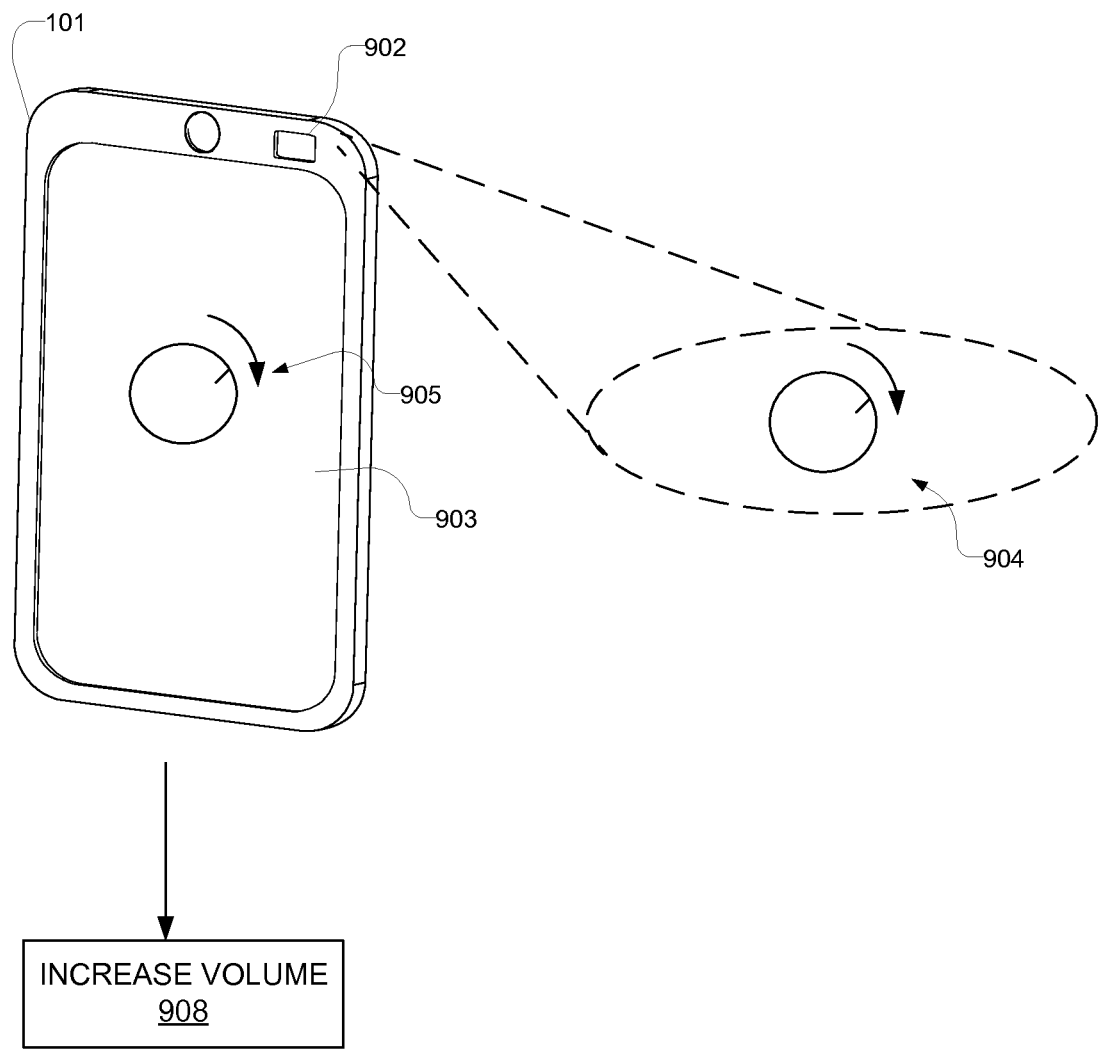
FIG. 9B is a diagram illustrating a second example operation of the physical world manipulation module of the device.

FIG. 9B is a diagram illustrating a second example operation of the physical world manipulation module 216 of the device 101. The device 101 detects that the knob 904 is physically manipulated to turn clockwise. The device 101 generates a virtual function 908 to increase the volume of a nearby stereo that has been assigned to the knob 904.

Figure 9C:
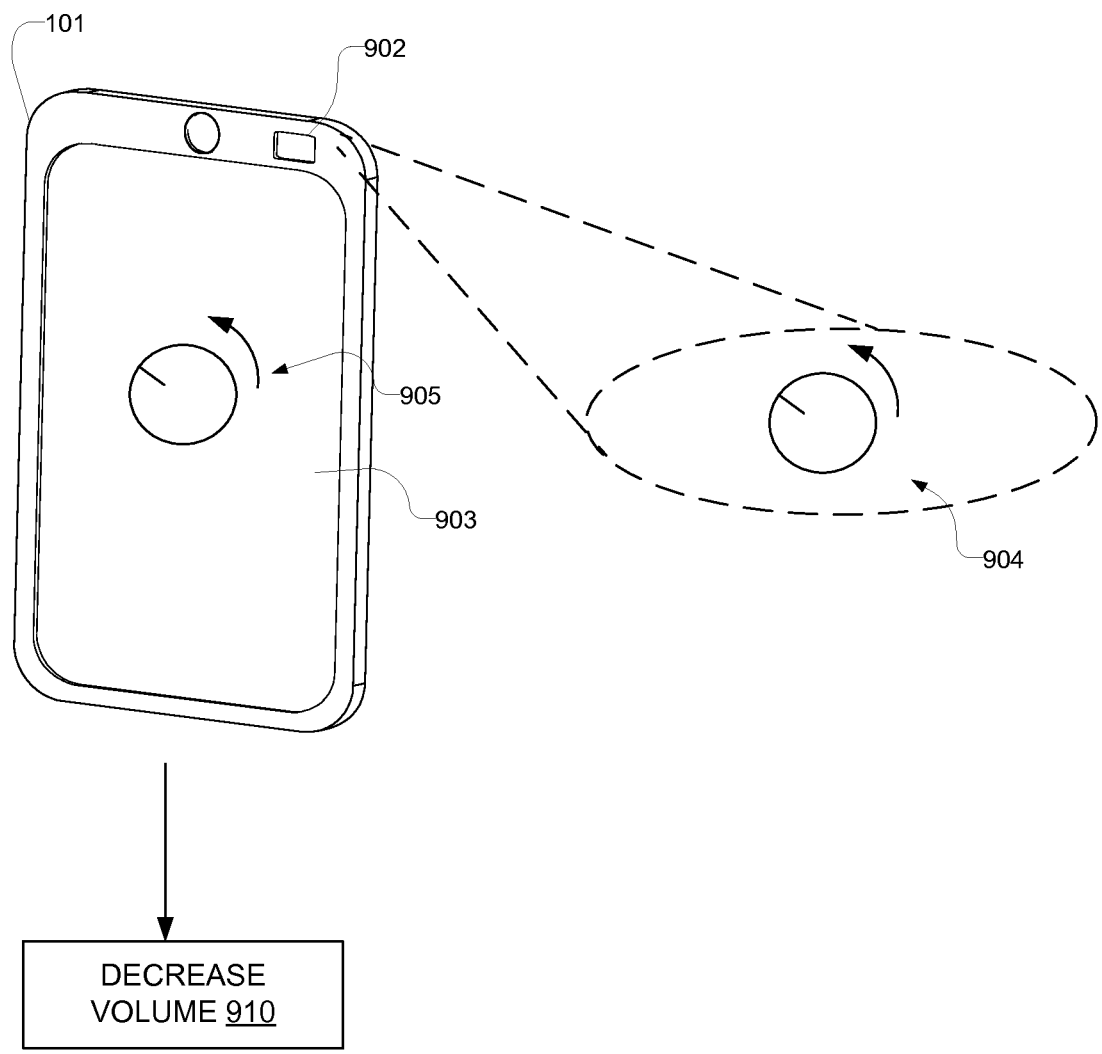
FIG. 9C is a diagram illustrating a third example operation of the physical world manipulation module of the device of FIG. 1.

FIG. 9C is a diagram illustrating a third example operation of the physical world manipulation module 216 of the device 101. The device 101 detects that the knob 904 is physically manipulated to turn counter-clockwise. The device 101 generates a virtual function 910 to lower the volume of a nearby stereo that has been assigned to the knob 904.

Figure 10:
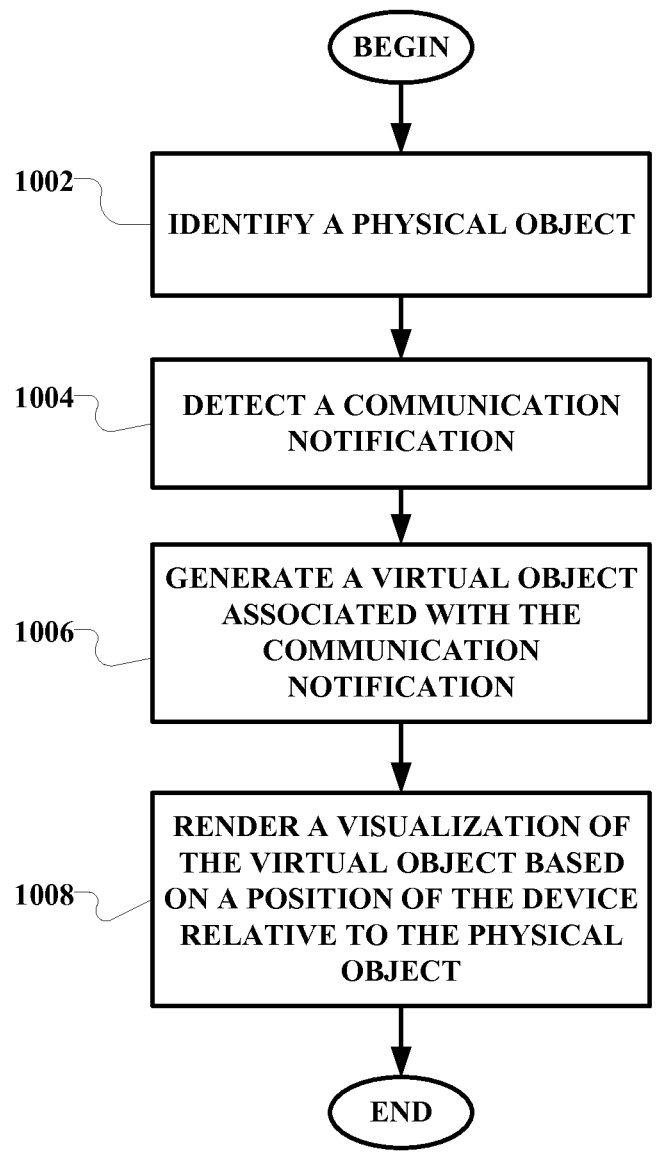
FIG. 10 is a flowchart illustrating an example operation of the contextual local image recognition dataset module of the device of FIG. 1, according to some example embodiments.

FIG. 10 is a flowchart illustrating an example operation of the contextual local image recognition dataset module of the device, according to some example embodiments. At operation 1002, the device 101 identifies a physical object. At operation 1004, the device 101 receives a communication notification associated with the physical object. At operation 1006, the device 101 generates a virtual object associated with the communication notification. At operation 1008, the device 101 renders a visualization of the virtual object based on a position of the device 101 relative to the physical object.

Figure 11:
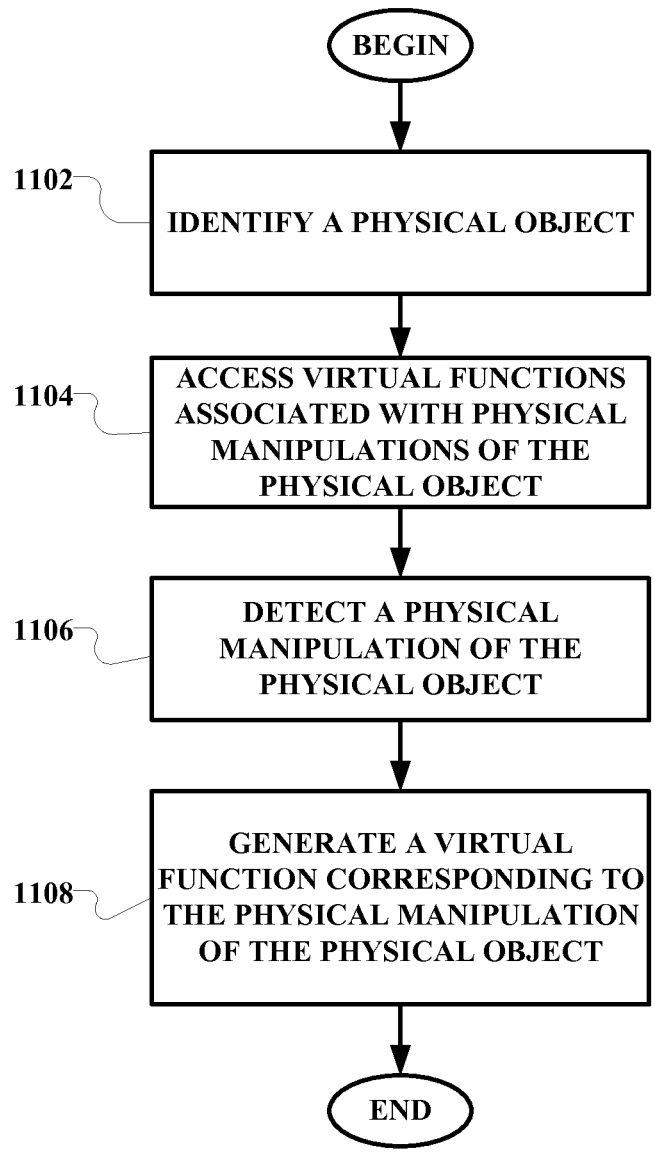
FIG. 11 is a flowchart illustrating another example operation of the contextual local image recognition dataset module of the device of FIG. 1, according to some example embodiments.

FIG. 11 is a flowchart illustrating another example operation of the contextual local image recognition dataset module of the device, according to some example embodiments. At operation 1102, the device 101 identifies a physical object. At operation 1104, the device 101 accesses virtual functions associated with physical manipulations of the physical object. At operation 1106, the device 101 detects a physical manipulation of the physical object. At operation 1108, the device 101 generates a virtual function corresponding to the physical manipulation of the physical object.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
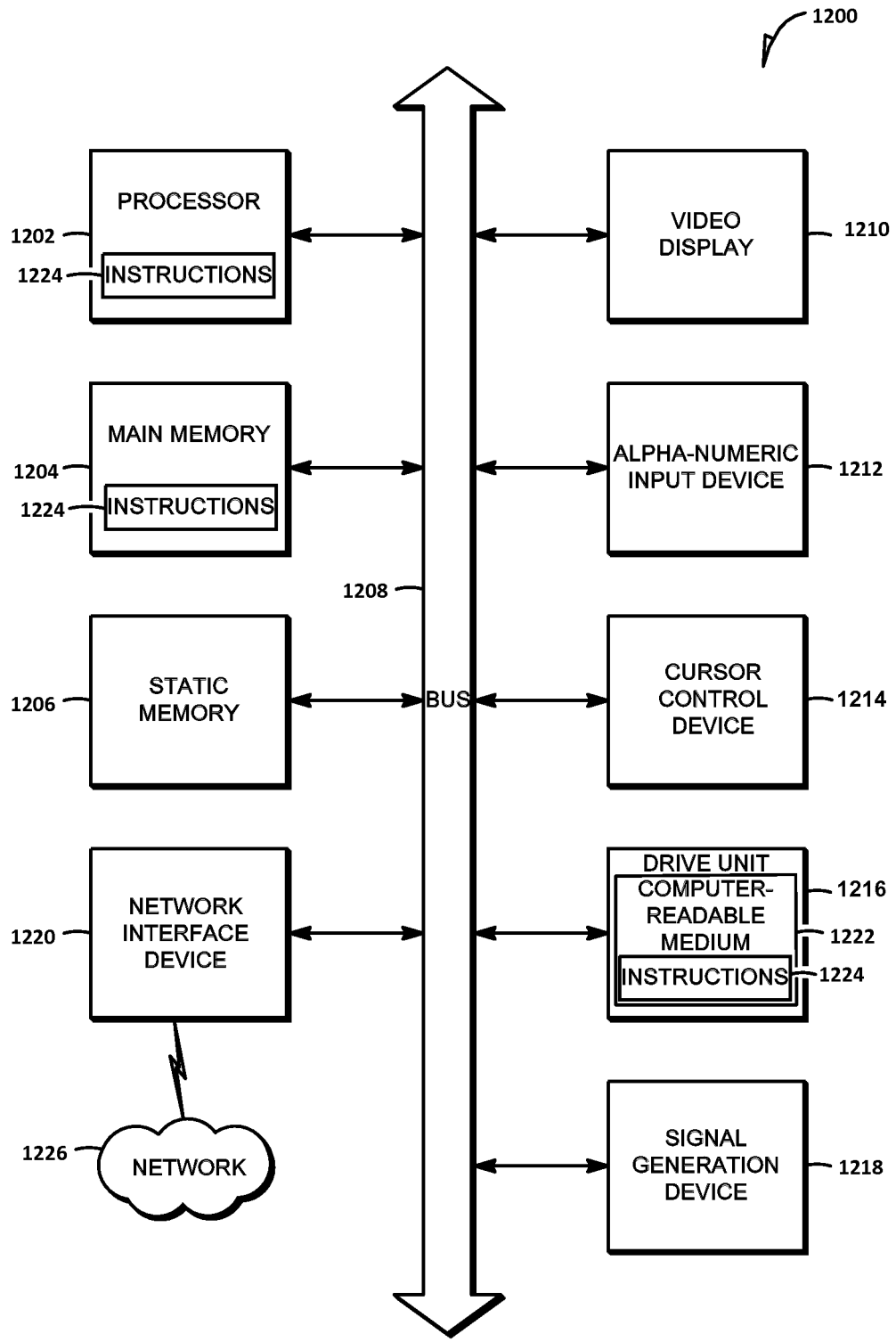
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, by a computing device, a primary content dataset from a remote server, the primary content dataset including a subset of known visual references stored by the remote server that were determined to be most popular by the remote server, wherein each known visual reference corresponds to a virtual object model;
storing, by the computing device, the primary content dataset in a local memory of the computing device;
after receiving the primary content dataset, capturing, by an optical sensor of the computing device, an image of a physical object, the image including a captured visual reference associated with the physical object;
searching, by the computing device, the primary content dataset stored in the local memory of the computing device based on the captured visual reference to identify a virtual object model corresponding to the captured visual reference associated with the physical object;
in response to determining that the captured visual reference is not included in the primary content dataset in the local memory of the computing device, transmitting, by the computing device, the image to the remote server, causing the remote server to search the known visual references stored by the remote server based on the captured visual reference to identify the visual object model corresponding to the captured visual reference;
receiving, from the remote server, the virtual object model corresponding to the captured visual reference associated with the physical object;
displaying, based on the virtual object model, a virtual image over a live image of the physical object;
in response to detecting a movement of the computing device relative to the physical object caused by the user, modifying the virtual image;
detecting a physical manipulation of the physical object;
identifying a virtual function assigned to the physical manipulation of the physical object; and
performing the identified virtual function, the virtual function controlling a physical device electrically unconnected to the physical object.

2. The method of claim 1, further comprising:
receiving a virtual functionality dataset comprising virtual functionalities associated with physical manipulations of the physical object.

3. The method of claim 1, further comprising:
receiving first notification data from a first account associated with an identification of a first physical object; and
receiving second notification data from a second account associated with an identification of a second physical object, the first notification data and the second notification data comprising an email notification, a calendar reminder notification, or a social network notification.

4. The method of claim 3, further comprising:
accessing reference identifiers associated with the first notification data;
accessing an augmented reality visualization associated with the reference identifiers associated with the first notification data; and
generating a virtual object engaged with a reference identifier in the image of the physical object using the augmented reality visualization associated with the reference identifier in the image of the physical object.

5. The method of claim 4, further comprising:
changing a feature of the virtual object, or replacing the virtual object with another virtual object based on the augmented reality visualization associated with the reference identifier in the image of the physical object.

6. The method of claim 2, further comprising:
generating the virtual function corresponding to the identified physical manipulation of the physical object.

7. The method of claim 6, further comprising:
generating a virtual user interface corresponding to the identified physical manipulation of the physical object.

8. The method of claim 6, further comprising:
activating a function on the computing device in response to the identified physical manipulation of the physical object.

9. The method of claim 6, further comprising:
generating a command for the virtual function to control another device in response to the identified physical manipulation of the physical object, the other device having no electronic communication with the physical object.

10. A non-transitory computer-readable medium storing instructions that, when executed by one or more computer processors of a computing device, cause the computing device to:
receive a primary content dataset from a remote server, the primary content dataset including a subset of known visual references stored by the remote server that were determined to be most popular by the remote server, wherein each known visual reference corresponds to a virtual object model;

store the primary content dataset in a local memory of the computing device;

after receiving the primary content dataset, capture an image of a physical object, the image including a captured visual reference associated with the physical object;

search the primary content dataset stored in the local memory of the computing device based on the captured visual reference to identify a virtual object model corresponding to the captured visual reference associated with the physical object;

in response to determining that the captured visual reference is not included in the primary content dataset in the local memory of the computing device, transmit the image to the remote server, causing the remote server to search the known visual references stored by the remote server based on the captured visual reference to identify the visual object model corresponding to the captured visual reference;

receive, from the remote server, the virtual object model corresponding to the captured visual reference associated with the physical object;

display, based on the virtual object model, a virtual image over a live image of the physical object;

in response to detecting a movement of the computing device relative to the physical object caused by the user, modify the virtual image;

detect a physical manipulation of the physical object;

identify a virtual function assigned to the physical manipulation of the physical object; and perform the identified virtual function, the virtual function controlling a physical device electrically unconnected to the physical object.

11. A computing device comprising:

one or more computer processors; and one or more computer-readable mediums storing instructions that, when executed by the one or more computer processors, cause the computing device to:

receive a primary content dataset from a remote server, the primary content dataset including a subset of known visual references stored by the remote server that were determined to be most popular by the remote server, wherein each known visual reference corresponds to a virtual object model;

store the primary content dataset in a local memory of the computing device;

after receiving the primary content dataset, capture an image of a physical object, the image including a captured visual reference associated with the physical object;

search the primary content dataset stored in the local memory of the computing device based on the captured visual reference to identify a virtual object model corresponding to the captured visual reference associated with the physical object;

in response to determining that the captured visual reference is not included in the primary content dataset in the local memory of the computing device, transmit the image to the remote server, causing the remote server to search the known visual references stored by the remote server based on the captured visual reference to identify the visual object model corresponding to the captured visual reference;

receive, from the remote server, the virtual object model corresponding to the captured visual reference associated with the physical object;

display, based on the virtual object model, a virtual image over a live image of the physical object;

in response to detecting a movement of the computing device relative to the physical object caused by the user, modify the virtual image;

detect a physical manipulation of the physical object;

identify a virtual function assigned to the physical manipulation of the physical object; and perform the identified virtual function, the virtual function controlling a physical device electrically unconnected to the physical object.

12. The computing device of claim 11, wherein the instructions further cause the computing device to:

receive a virtual functionality dataset comprising virtual functionalities associated with physical manipulations of the physical object.

13. The computing device of claim 11, wherein the instructions further cause the computing device to:

receive first notification data from a first account associated with an identification of a first physical object; and receive second notification data from a second account associated with an identification of a second physical object, the first notification data and the second notification data comprising an email notification, a calendar reminder notification, or a social network notification.

14. The computing device of claim 13, wherein the instructions further cause the computing device to:

access reference identifiers associated with the first notification data;

access an augmented reality visualization associated with the reference identifiers associated with the first notification data; and generate a virtual object engaged with a reference identifier in the image of the physical object using the augmented reality visualization associated with the reference identifier in the image of the physical object.

15. The computing device of claim 14, wherein the instructions further cause the computing device to:

change a feature of the virtual object; and replace the virtual object with another virtual object based on the augmented reality visualization associated with the reference identifier in the image of the physical object.

16. The computing device of claim 12, wherein the instructions further cause the computing device to:

identify the physical object and virtual functionalities associated with physical manipulations of the physical object, the physical object including a non-electric physical object;

identify the physical manipulation of the physical object; and generate the virtual function corresponding to the identified physical manipulation of the physical object.

17. The computing device of claim 16, wherein the instructions further cause the computing device to:

generate a virtual user interface corresponding to the identified physical manipulation of the physical object.

18. The computing device of claim 16, wherein the instructions further cause the computing device to:

activate a function on the device in response to the identified physical manipulation of the physical object.

19. The computing device of claim 16, wherein the instructions further cause the computing device to:

generate a command for the virtual function to control another device in response to the identified physical manipulation of the physical object, the other device having no electronic communication with the physical object.

20. The computing device of claim 16, wherein the physical manipulation of the physical object comprises moving or rotating the physical object.

\* \* \* \* \*